No. 773,960. PATENTED NOV. 1, 1904.
E. S. MOORE.
MILK RECEPTACLE.
APPLICATION FILED JULY 9, 1903.
NO MODEL.
Fig. 1.
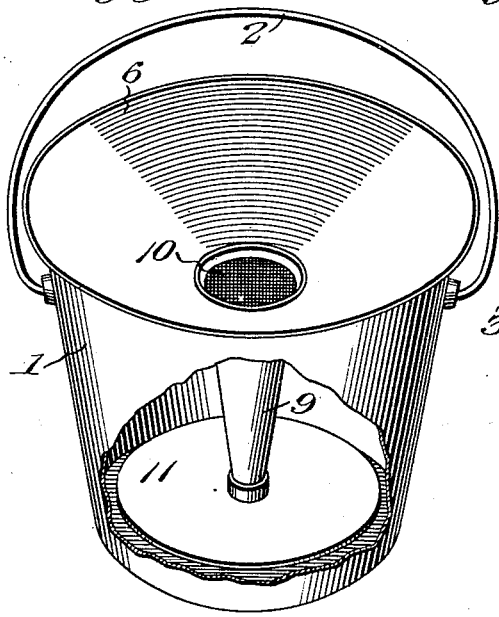
Fig. 2.
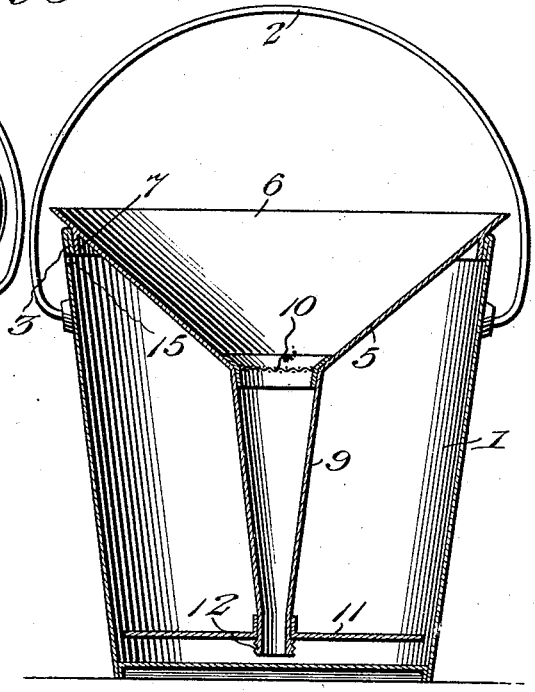
Fig. 3. Fig. 5. Fig. 4.
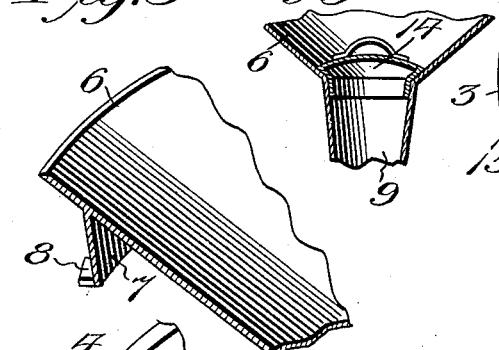
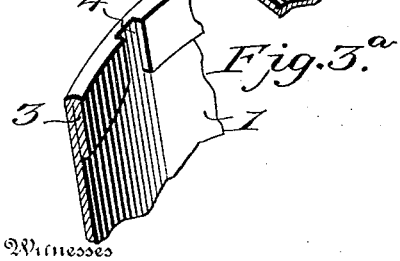
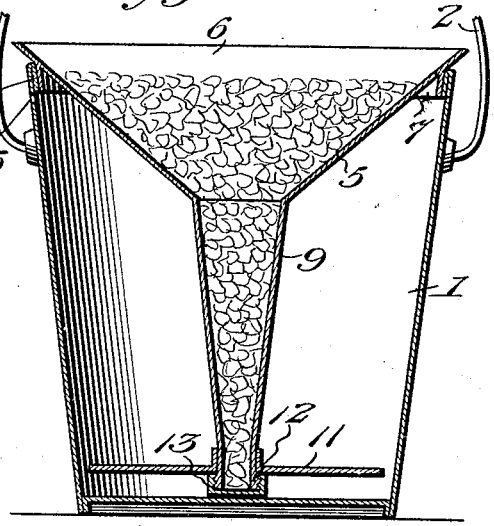
Witnesses
Edwin F. McKee
John F. Byrne
Inventor
Edward S. Moore
By Victor J. Evans
Attorney No. 773,960. Patented November 1, 1904.

UNITED STATES PATENT OFFICE.

EDWARD S. MOORE, OF SAN FRANCISCO, CALIFORNIA, ASSIGNOR TO GERTRUDE MOORE, OF DECORAH, IOWA.

MILK-RECEPTACLE.

SPECIFICATION forming part of Letters Patent No. 773,960, dated November 1, 1904.

Application filed July 9, 1903. Serial No. 164,860. (No model.)

*To all whom it may concern:*

Be it known that I, EDWARD S. MOORE, a citizen of the United States, residing at San Francisco, in the county of San Francisco and State of California, have invented new and useful Improvements in Milk-Receptacles, of which the following is a specification.

This invention relates to a milk pail or receptacle; and the primary object of the same is to provide a simple and effective device adapted for use in preliminary milking operations to directly receive the milk from a cow and strain the same, to transport or ship milk without the use of any other means, to refrigerate milk or cream during transportation and capable of any disposition without liability of leakage or loss of milk or cream therefrom, and to materially reduce the number of receptacles ordinarily employed in dairy-work.

A further object of the invention is to provide a receptacle for milk or cream adapted for domestic use and having means in connection therewith for insuring a cleanly condition of the milk or cream when delivered or vended.

A further object of the invention is to expedite the handling of milk by decreasing the number of operations usually employed in preparing the same for shipment and delivery.

A still further object of the invention is to provide a milk or cream receiving shipping and storage receptacle which is quickly convertible from one use into another and comparatively inexpensive in the cost of manufacture when considered from the standpoint of adaptability for service in different forms and the replacement of several individual devices for the same purpose as in ordinary methods.

The invention primarily consists of a pail-like receptacle in which a funnel member is removably mounted and provided with a deflector at its lower end, close to the bottom of the receptacle, and a removable strainer, the lower end of the funnel member being adapted to receive a closing-cap and the strainer to be replaced by a closure when the device is arranged for certain uses.

The invention further consists in the details of construction and arrangement of the several parts, which will be more fully hereinafter described and claimed.

In the drawings, Figure 1 is a perspective view of a receptacle embodying the features of the invention and shown broken away. Fig. 2 is a transverse vertical section of the same. Fig. 3 represents a detail perspective view of the upper portion or rim of the receptacle and a part of the funnel member, and Fig. 3$^a$ is a similar view showing means for holding said member in reliable connection with the receptacle. Fig. 4 is a transverse vertical section through the receptacle and funnel member to show said parts arranged for refrigerating purposes. Fig. 5 is a transverse vertical section through a portion of the funnel member, showing a removable closure or cover applied thereto.

Similar numerals of reference are employed to indicate corresponding parts in the several views.

The numeral 1 designates a pail similar in contour to the ordinary milk-pail and provided with a bail or handle 2. The rim of the pail is formed with an inturned flange 3, having at intervals slots 4 therethrough. The number of these slots may be varied at will and are adapted in conjunction with the flange to provide a simple means for removably securing a funnel member 5 in the pail. This funnel member comprises an upper enlarged bell 6, having a depending flange 7, with outwardly-projecting catch-lugs 8 at regular intervals of such dimensions as to readily pass through the slots 4, the flange 7 being of such length or downward extent in relation to the bell 6 as to permit the catch projections or lugs 8 to engage the lower edge of the flange 3, and thus firmly hold the funnel member secured in the pail. The upper edge of the bell 6 projects outwardly over the rim of the pail to insure a flow of the milk into the funnel member and avoid contact thereof with and leakage through the joint formed between the funnel member or bell of the latter and rim of the pail. The lower reduced portion of the bell 6 has a converging tube 9 depending therefrom, and at the point of intersection of the said tube with the bell a strainer 10 is removably applied. Secured to the lower reduced end of the tube 9 is a deflector 11 of disk-like form, which is positioned near the bottom of the pail when the funnel member is applied and is of less diameter than the lower portion of the pail to permit the milk to flow upwardly into the pail from the lower end of the tube 9. The lower end of the tube 9 when the funnel member is secured in the pail is located near the bottom of the latter, below the deflector 11, and is externally screw-threaded, as at 12, to removably receive a cap 13, as shown by Fig. 4, which forms part of the complement of the improved device and is applied in certain uses of the receptacle.

As shown by Fig. 5, the receptacle or pail includes as a part of its equipment a cover or closure 14, which is inserted in the upper enlarged extremity of the tube 9 after the strainer 10 has been removed during transportation or shipment of the pail and milk therein to prevent the latter from escaping through the funnel member and permitting the pail to be disposed in any position without liability of loss of the milk or cream contained therein. The closure or cover 14 is also used when cold water is inserted in the tube 9 to preserve the contents of the pail or during storage, as in restaurants, hotels, and the like. The deflector 11 acts as an obstruction to the escape or leakage of the milk or cream from the pail and also facilitates the upflow of the milk or cream run in the pail through the funnel member. The upper portion of the pail, adjacent the flange 3, has an air-vent 15 to avoid any presence of air-pressure which would prevent the milk or cream rising in the pail when poured through the funnel member.

The several parts of the device can be readily separated for cleaning the same, and it is preferred in the construction of the elements of the pail or receptacle that non-corrosive metal be employed, and in some instances glazed metal may be used.

In pursuing the preliminary milking operation the pail, as shown by Figs. 1 and 2, with the strainer 10 applied thereto is placed under the cow to receive the milk, which is strained and passes into the body of the pail in a cleanly condition. During this milking operation if the pail be kicked over loss of milk will not ensue in view of the fact that there is no means of escape for the same, as the deflector 11 will prevent the milk seeking a ready outlet through the lower reduced end of the tube 9. In this condition for ordinary use the pail and its contents may be temporarily stored, or if it is desired to ship or transport the pail and its contents the strainer 10 may be removed and the closure or cover 14 substituted therefor. If it is necessary to preserve the milk or cream during long periods of shipment or transportation, the cap 13 may be applied to the lower reduced end of the tube 9 by first removing the funnel member 5 from the pail, then reapplying said funnel member and filling the tube 9 with refrigerating material, such as ice or cold water, and afterward sealing the tube by inserting the closure or cover 14 therein. As shown by Fig. 4, the pail and its contents may be stored under the most favorable conditions from a standpoint of preservation of the milk or cream by applying the cap 13 to the lower reduced end of the tube 9 and filling the bell and tube with ice or water, thus adapting the pail both for domestic and hotel and restaurant uses. In filling the device with water the same may be readily disposed under a faucet. It will be understood that when the pail and its contents are shipped or transported the air-vent 15 will be closed by a suitable plug or stopper and leakage at this point obviated.

It is also proposed to employ the improved pail for domestic uses by varying the proportions thereof to contain definite quantities of milk or cream and to receive the latter from a delivery-wagon or can of large proportion. In this particular service the strainer may be left in the upper extremity of the tube 9, and the milk poured into the funnel member will be subjected to a straining operation and insure cleanliness, as well as purity. This is particularly advantageous in view of the fact that during the vending of milk it often becomes dirty or collects and absorbs dust and grit. The milk after being poured into the receptacle can then be preserved, as before explained, or the pail may be disposed in a refrigerator and sealed by applying the closure or cover 14 in place of the strainer 10.

The invention has many other advantages that will become apparent by use, and after disposal of milk or cream within the pail or receptacle through the funnel member the latter may be withdrawn at any time to permit the contents of the pail to be freely accessible. It will be understood that when the funnel member is applied and rotated the projections or lugs 8 will firmly bind under the edge of the flange 3, and the operation of attaching and detaching the funnel member will thus be rendered simple.

Having thus fully described the invention, what is claimed as new is—

1. An attachment for milk-pails comprising a funnel having a tube depending therefrom provided with a screw-threaded lower end, a disk-shaped deflector having a central opening with an upwardly-projecting surrounding collar mounted on the end of the tube above its screw-threads, and a removable screw-threaded cap secured to the threads of said tube whereby to close the open end of the same and also providing means to hold the deflector in position on said tube, substantially as specified.

2. A milk-receptacle, consisting of an ordinary pail having its upper edge turned inwardly closely thereagainst and provided with vertical slots therein at intervals, a funnel member fitted in the pail, the bell of the said funnel member projecting above the upper edge of the pail and having a depending flange to fit within the top of the pail, said flange having outstanding catch projections at intervals to pass through the slots and engage the lower terminals of the upper inturned edge of the pail, when the said funnel member is rotated, the tube of the funnel member projecting downwardly to near the bottom of the pail, a closing-cap removably applied to the lower end of the tube, and a deflector secured on the tube above the cap.

3. A milk-pail of ordinary form with imperforate bottom and side, a funnel member centrally disposed in the said pail and having the bell thereof projecting above and closely engaging the upper edge of the pail to form a closure for the latter and the tube extending downwardly to near the bottom of the pail, an obstructing device removably inserted in the upper terminal of the tube where the latter joins the lower reduced portion of the bell, a closing-cap removably mounted on the lower end of the tube, and an imperforate deflector secured on the lower end of the tube above the cap.

In testimony whereof I affix my signature in presence of two witnesses.

EDWARD S. MOORE.

Witnesses:
   CHAS. S. HYER,
   JESSIE A. KING.